3,069,311
PAPER MANUFACTURE

John A. Harpham and Harry W. Turner, Wilmington, Del., assignors to Hercules Powder Company, Wilmington, Del., a corporation of Delaware
No Drawing. Filed Mar. 28, 1962, Ser. No. 183,011
10 Claims. (Cl. 162—146)

This invention relates to a method for the production of an improved paper and, more particularly, to a method for making paper having increased porosity and absorbency as well as uniform formation, employing cross-linked pulp.

In the art of porous absorbent papers, the most important properties are porosity, absorbency and formation. Porosity determines the rate at which liquids or gases can be passed through the paper and is of obvious importance for filtration purposes. Absorbency governs the rate at which liquids are picked up by the paper and, in making saturated and impregnated papers, it controls the rate of production of the paper. Both efficient filtration and uniform pick-up of impregnant require a paper of uniform formation.

It is known that although different pulps respond at somewhat different rates to the beating operation in papermaking, they all respond in a similar manner, that is, with increased beating of the pulp the resultant paper has lower porosity and absorbency but more uniform formation. Therefore, the papermaker must make a compromise between a small amount of beating to maintain high sheet porosity and absorbency and a large amount of beating to obtain uniform formation.

Likewise, it is well known how to prepare cross-linked cellulose applicable to the present invention by reaction with the polyfunctional and equivalent reagents disclosed herein. However, insofar as known, such cross-linked cellulose has not been employed in the manufacture of paper, much less in accordance with the present invention to give the surprising results of markedly increased porosity and absorbency without sacrifice in uniformity of formation.

An object of this invention is an improved paper and method of preparing same. A further object is a process of preparing a paper having increased porosity and absorbency without sacrifice in uniformity of formation. A still further object is such a process wherein the fibrous material employed is cross-linked cellulose. Another object is such a process wherein the fibrous material employed is cellulose which has been reacted with a polyfunctional reagent.

It has been found according to this invention that a marked increase in porosity and absorbency of paper without sacrifice in uniformity of formation can be obtained by employing cross-linked cellulose as a feed in the preparation of paper. The cross-linking must be carried out prior to the refining operation (i.e. prior to beating) in conventional papermaking processes, the type cross-linkage being an intrafiber chemical bonding. By intrafiber chemical bonding is meant that the cross-linking occurs between the cellulose molecules within any given fiber instead of between cellulose molecules in different fibers (interfiber chemical bonding). The cross-linking is effected by reacting cellulose with formaldehyde or a reagent having at least two reactive functional groups.

The term "polyfunctional reagent" is used in the specification and claims of this application to include formaldehyde and compounds having at least two functional groups reactive with cellulose or cellulosic materials. By the term "poly" as used herein is meant at least two. In addition to formaldehyde, these reagents comprise polyhalides, e.g. 1,3-dichloroacetone; polyaldehydes, e.g. glyoxal; polyepoxides, e.g. epichlorohydrin; and the like. For the reasons more fully discussed and exemplified hereinafter, when formaldehyde or a polyaldehyde is the cross-linking reagent we have found it necessary (1) that the cross-linking temperature not exceed about 60° C., (2) that the mineral acid used as cross-linking catalyst be a substantially nonoxidizing acid, and (3) that substantially all of the residual acid be removed from the cross-linked pulp before drying it.

The improved paper of this invention is clearly evident from the Examples 1–21 given below. Percent and ratio, as used in the examples and elsewhere herein, are on a weight basis. In all the Examples 1–21 the samples were refined at 2.5 percent consistency and neutral pH in a 1¼ pound Valley laboratory beater for 1.5 and 2.0 hours with bedplate arm loads of 4.5–6.0 kg., depending on the condition of the beater's tackle as judged by running a standard pulp. The samples were handsheeted to a 40 pound basis weight (24 x 36—500 sheet ream) using Noble and Wood handsheeting equipment. This operation involved forming the handsheet from a 0.025% slurry in the deckle box (closed white water system), wet pressing it between felts, and drum drying it on the screen at approximately 116° C.

Handsheets were tested for water absorption (TAPPI standard method T432m–45) and air resistance (TAPPI standard method T460m–49). These tests actually measure the reciprocal of the property being determined. Method T432m–45 measures the time (in seconds) for a 0.1-ml. drop of water to be absorbed into the sheet; thus, the longer the time, the lower is the absorbency of the sheet. Method T460m–49 measures the time (in seconds) for 100 cc. of air under a constant pressure to pass through 1.0 square inch of paper; thus, the longer the time, the lower is the porosity of the sheet. The uniformity of handsheet formation was judged visually in comparison to control handsheets.

EXAMPLES 1, 8 AND 15

*Tables 1, 2 and 4*

CONTROL

A 600 gram sample of mechanically cleaned raw second-cut cotton linters was purified in the laboratory by conventional technique including alkali digestion under elevated temperature and pressure followed by bleaching, then washed, centrifuged and dried to give a yield of 85.6% pulp. The pulp was made into handsheets and tested in the manner described above. Additional data are given in Tables 1, 2 and 4 below.

EXAMPLE 2

*Table 1*

BLANK

A 600 gram sample of raw second-cut cotton linters was steeped in 10 parts of 8% aqueous sodium hydroxide for 20 minutes at about room temperature, then centrifuged and tumbled in vacuo overnight at room temperature. This treatment was followed by conventional purification as in Examples 1, 8 and 15. The resulting linters were washed, centrifuged and dried to give a yield of 84.5% pulp. The pulp was made into handsheets and tested in the manner described above. Additional data are given in Table 1 below.

EXAMPLES 3 AND 16

*Tables 1 and 4*

EPICHLOROHYDRIN

A 100 pound sample of raw second-cut cotton linters was steeped in 10 parts of 7.7% aqueous sodium hydroxide for 20 minutes at 38° C.–43° C. and centrifuged. The alkali cellulose was charged to the digester at 35° C. and 4 pounds of epichlorohydrin added and the mixture tumbled 1.5 hours during which time the temperature was raised to 110° C. This treatment was followed by conventional purification as in Examples 1, 8 and 15. The resulting cross-linked purified pulp was made into handsheets and tested as described above. Additional data appear in Tables 1 and 4 below.

EXAMPLES 4, 13 and 17

*Tables 1, 3 and 4*

EPICHLOROHYDRIN

A 600 gram sample of mechanically cleaned raw second-cut cotton linters was steeped in 10 parts of 8% sodium hydroxide for 20 minutes at room temperature and then centrifuged. 93 grams of epichlorohydrin was sprayed on the resulting alkali cellulose and the mixture tumbled in vacuo for 70 hours at room temperature. This treatment was followed by conventional purification as in Examples 1, 8 and 15 to give a yield of 83.0% pulp. The resulting cross-linked pulp was made into handsheets and tested as described above. Additional data appear in Tables 1, 3 and 4 below.

EXAMPLES 5 AND 20

*Tables 1 and 4*

1,3-DICHLOROACETONE

A 600 gram sample of raw second-cut cotton linters was steeped in 10 parts of 8% aqueous sodium hydroxide for 20 minutes at room temperature and centrifuged. To the alkali cellulose was added 60 grams of 1,3-dichloroacetone in 500 ml. of 40% aqueous isopropyl alcohol and the resulting mixture tumbled in vacuo for 4 hours at room temperature. After purifying as described in Examples 1, 8 and 15, the 84.0% yield of cross-linked pulp was made into handsheets and tested as described above. Additional data appear in Tables 1 and 4 below.

EXAMPLES 6 AND 12

*Tables 1 and 3*

CONTROL

A 1 pound sample of mechanically cleaned raw second-cut cotton linters which had been commercially purified in the plant in a manner similar to the laboratory purification in Examples 1, 8 and 15 was made into handsheets and tested in the manner described above. Additional data are given in Tables 1 and 3 below.

EXAMPLE 7

*Table 1*

EPICHLOROHYDRIN

A 500 gram sample of mechanically cleaned raw second-cut cotton linters which had been commercially purified in a manner similar to the purification in Examples 6 and 12 was steeped in 10 parts of 8% aqueous sodium hydroxide for 20 minutes at room temperature and then centrifuged. The resulting alkali cellulose was sprayed with 25 grams of epichlorohydrin and tumbled for 65 hours at room temperature. The product was washed and dried to give a yield of 96.8% cross-linked pulp. Additional data are given in Table 1 below.

*Table 1*

| Ex. | Cross-linking reagent | | Beating time, hr. | Water absorption, sec. | Air resistance, sec./100 cc./in.² | Formation compared to control |
|---|---|---|---|---|---|---|
| | Kind | Amount, percent on fiber | | | | |
| 1 | None (lab. purified control for Examples 2–5) | None | 1.5<br>2.0 | 59<br>104 | 12<br>43 | |
| 2 | None (caustic steep blank for Examples 3–5) | None | 1.5<br>2.0 | 57<br>103 | 10<br>56 | |
| 3 | Epichlorohydrin | 4 | 1.5 | 10 | 2 | More uniform. |
| 4 | do | 15.5 | 1.5<br>2.0 | 4<br>8 | 0.2<br>0.8 | Do.<br>Do. |
| 5 | 1,3-dichloroacetone | 10 | 1.5<br>2.0 | 42<br>57 | 6<br>13 | Equally uniform.<br>Do. |
| 6 | None (commercial purified control for Example 7) | None | 1.5<br>2.0 | 61<br>87 | 7<br>32 | |
| 7 | Epichlorohydrin | 5 | 1.5<br>2.0 | 7<br>14 | <1<br>1.4 | More uniform.<br>Do. |

EXAMPLE 9

*Table 2*

CONTROL

A 600 gram sample of raw second-cut cotton linters was heated at reflux for 1 hour in 15 parts by volume of acetone containing 1% (by weight based on fiber) of sulfuric acid. After being thoroughly washed with water, the pulp was purified as in Examples 1, 8 and 15 to give a yield of 83.3%. The purified pulp was made into handsheets and tested as described above. Additional data appear in Table 2 below.

EXAMPLE 10

*Table 2*

FORMALDEHYDE

The conditions of Example 9 were repeated with 60 grams of formaldehyde added to the acidic acetone-linters mixture before refluxing. After being washed and purified, the resulting 79.5% yield of cross-linked pulp was made into handsheets and tested as described above. Additional data appear in Table 2 below.

EXAMPLE 11

Table 2

GLYOXAL

The conditions of Example 10 were repeated, using 60 grams of glyoxal instead of formaldehyde. After being washed and purified, the resulting 81.5% yield of cross-linked pulp was made into handsheets and tested as described above. Additional data appear in Table 2 below.

Table 2

| Ex. | Cross-linking reagent | | Beating time, hr. | Water absorption, sec. | Air resistance, sec./ 100 cc./in.² | Formation compared to control |
|---|---|---|---|---|---|---|
| | Kind | Amount, percent on fiber | | | | |
| 8 | None (lab. purified control) | None | 1.5 | 59 | 12 | |
| | | | 2.0 | 104 | 43 | |
| 9 | None (blank boiled in acidic acetone) | None | 1.5 | 61 | 11 | |
| | | | 2.0 | 88 | 45 | |
| 10 | Formaldehyde | 10 | 1.5 | 35 | 8 | More uniform. |
| | | | 2.0 | 76 | 15 | Do. |
| 11 | Glyoxal | 10 | 1.5 | 48 | 11 | Do. |
| | | | 2.0 | 81 | 16 | Do. |

EXAMPLE 14

Table 3

CROSS-LINKED FIBER-NONCROSS-LINKED FIBER BLEND

A 500 gram sample of mechanically cleaned second-cut raw cotton linters was steeped in 10 parts of 8% aqueous sodium hydroxide for 20 minutes at room temperature and then centrifuged. 75 grams of epichlorohydrin was sprayed on the resulting alkali cellulose and the mixture tumbled in vacuo for 5 hours at room temperature. This treatment was followed by conventional purification as in Examples 1, 8 and 15 to give a yield of 76.0% cross-linked pulp. 0.5 pound of this cross-linked pulp was blended with 0.5 pound of commercially purified cotton linters of the type used in Examples 6 and 12. The resulting blend of pulp was made into handsheets and tested as described above. Additional data appear in Table 3 below.

Table 3

MIXTURE OF CROSS-LINKED AND NONCROSS-LINKED PULPS

| Ex. | Commercial purified linters, lbs. | Cross-linked linters, lbs. | Beating time, hrs. | Water absorption, sec. | Air resistance sec./100 cc./in.² | Formation compared to control |
|---|---|---|---|---|---|---|
| 12 | 1 | None | 1.5 | 61 | 7 | |
| | | | 2.0 | 87 | 32 | |
| 13 | None | 1 | 1.5 | 4 | 0.2 | More uniform. |
| | | | 2.0 | 8 | 0.8 | Do. |
| 14 | 0.5 | 0.5 | 1.5 | 15 | 2 | Do. |
| | | | 2.0 | 36 | 12 | Do. |

EXAMPLE 18

Table 4

SUBSTITUTION (GLYCIDOL)

A 600 gram sample of mechanically cleaned raw second-cut cotton linters was steeped in 10 parts of 8% aqueous sodium hydroxide for 20 minutes at room temperature and then centrifuged. To the alkali cellulose was added 92.8 grams of glycidol and the resulting mixture tumbled in vacuo for 4 hours at room temperature. After purification as described in Example 1, 8 and 15, the 85.7% yield of substituted pulp was made into handsheets and tested as described above. Additional data appear in Table 4 below.

EXAMPLE 19

Table 4

SUBSTITUTION (α-CHLOROHYDRIN)

A 500 gram sample of mechanically cleaned raw second-cut cotton linters was steeped in 10 parts of 8% aqueous sodium hydroxide for 20 minutes at room temperature and then centrifuged. 50 grams of α-chlorohydrin in 50% aqueous solution was sprayed onto the alkali cellulose and the resulting mixture tumbled in vacuo for 21 hours at room temperature. After purification as described in Examples 1, 8 and 15, the 77.6% yield of substituted pulp was made into handsheets and tested as described above. Additional data appear in Table 4 below.

EXAMPLE 21

Table 4

SUBSTITUTION (CHLOROACETONE)

A 500 gram sample of mechanically cleaned raw second-cut cotton linters was steeped in 10 parts of 8% aqueous sodium hydroxide for 20 minutes at room temperature and then centrifuged. 50 grams of chloroacetone in a 50% aqueous solution was sprayed onto the alkali cellulose and the resulting mixture tumbled in vacuo for 16 hours at room temperature. After purification as described in Examples 1, 8 and 15, the 81.3% yield of substituted pulp was made into handsheets and tested as described above. Additional data appear in Table 4 below.

Table 4

HANDSHEET PROPERTIES OF CHEMICALLY MODIFIED LINTERS PULPS—EFFECT OF CROSS-LINKING VS. SUBSTITUTION

| Example | Treatment | | | Beating time, hr. | Water absorption, sec. | Air resistance, sec./100 cc./in.² |
| --- | --- | --- | --- | --- | --- | --- |
| | Reagent | Percent on fiber | Reaction | | | |
| 15 | None (lab. purified control for Examples 16-21). | None | None | 1.5<br>2.0 | 59<br>104 | 12<br>43 |
| 16 | Epichlorohydrin<br>$CH_2\!\!-\!\!\!\overset{O}{\overset{\diagup\ \ \diagdown}{}}\!\!\!CH\!\!-\!\!CH_2Cl$ | 4 | Cross-linking | 1.5 | 10 | 2 |
| 17 | Epichlorohydrin | 15.5 | ---do--- | 1.5<br>2.0 | 4<br>8 | 0.2<br>0.8 |
| 18 | Glycidol<br>$CH_2\!\!-\!\!\!\overset{O}{\overset{\diagup\ \ \diagdown}{}}\!\!\!CH\!\!-\!\!CH_2OH$ | 15.5 | Substitution | 1.5<br>2.0 | 38<br>100 | 14<br>36 |
| 19 | α-Chlorohydrin<br>$ClCH_2\!\!-\!\!CHOH\!\!-\!\!CH_2OH$ | 10 | ---do--- | 1.5<br>2.0 | 56<br>85 | 12<br>41 |
| 20 | 1,3-dichloroacetone<br>$ClCH_2\!\!-\!\!\overset{\overset{O}{\|}}{C}\!\!-\!\!CH_2\!\!-\!\!Cl$ | 10 | Cross-linking | 1.5<br>2.0 | 42<br>57 | 6<br>13 |
| 21 | Chloroacetone<br>$ClCH_2\!\!-\!\!\overset{\overset{O}{\|}}{C}\!\!-\!\!CH_3$ | 10 | Substitution | 1.5<br>2.0 | 54<br>91 | 12<br>58 |

The above examples clearly show that when polyfunctional reagents are used to cross-link cellulose prior to the papermaking refining operation, paper made from the resulting pulp is far more porous and absorbent than paper made from pulp which has not been cross-linked. In some instances the improved paper product made according to the present invention was as much as sixty times more porous and fifteen times more absorbent than conventional papers. Furthermore, this remarkable improvement in porosity and absorbency is obtained without any sacrifice in uniformity of formation and often in combination with an increase in uniformity of formation. It will also be noted from the foregoing examples that the present invention is applicable to cross-linking purified cotton linters (Examples 6 and 7) as well as raw cotton linters (for instance, see Examples 2-5). In addition, the foregoing examples show that the present invention is applicable to employing a mixture of cross-linked linters and noncross-linked linters, the improvements imparted to the resulting paper made therefrom being proportional to the relative amount of cross-linked linters used. The examples of Table 4 show that the present invention is not applicable to monofunctional reagents because such reagents cause substitution in the cellulose molecule and give substantially no improvement in absorption and porosity of paper made from such substituted pulp (Examples 18, 19 and 21 compared with Example 15), whereas polyfunctional reagents produce cross-linking and give a substantial increase in absorbency and porosity in paper made from the cross-linked pulp (Examples 16, 17 and 20 compared with Example 15). Since the formation of both the cross-linking examples and the substitution examples in Table 4 above were substantially equal, formation did not help to distinguish cross-linking from substitution and therefore was not reported in Table 4. Cross-linking Examples 16, 17 and 20 in Table 4 are the same as 3, 4 and 5, respectively in Table 1. It is also apparent from the above examples that, by itself, treatment preparatory to cross-linking (i.e., caustic steeping and heating at reflux in acidic acetone) contributed substantially nothing to the desired properties of the paper.

As mentioned hereinbefore, when formaldehyde or a polyaldehyde is the cross-linking reagent, we have found it necessary (1) that the cross-linking temperature not exceed about 60° C., (2) that the mineral acid used as cross-linking catalyst be a substantially nonoxidizing acid, and (3) that substantially all of the residual acid be removed from the cross-linked pulp before drying it. Thus, we have found that cross-linking at a temperature much above 60° C. gives a paper which is too brittle to be of any practical use (Example 22), whereas cross-linking at 60° C. gives good results (Example 23). It is known in this art that when using formaldehyde or a polyaldehyde one must cross-link in the presence of an acid as cross-linking catalyst. In accordance with the present invention we have found that the acid must be a substantially nonoxidizing mineral acid. Thus, nitric acid is not operable for the purposes of our invention even at 60° C.; and this is true whether or not the residual acid is removed before drying the paper (Examples 24 and 25). Operable mineral acids include e.g., sulfuric, hydrochloric and phosphoric acids, and their performance has been found to be about the same according to our invention. In addition, we have found that most all of the acid remaining after cross-linking must be removed from the pulp before drying (Examples 26 and 23). Examples 27 and 28 show that nitric acid degradation of the pulp becomes even more severe as the cross-linking reaction temperature exceeds 60° C.

The following Examples 22-29 further illustrate our invention, particularly as to the critical conditions discussed in the immediately preceding paragraph. Except as otherwise shown, these examples were carried out under the same conditions used in Examples 1-21. The main differences used in carrying out Examples 22-29 include the following: sulfite pulp instead of cotton linters, 4/1 ratio in the mixture of cross-linked/noncross-linked pulp, and one hour beating time instead of 1.5 hours and 2 hours (the latter being due to the fact that sulfite pulp requires less beating than linters since it hydrates considerably faster than linters).

The following procedure was used in Example 29 which is a control example. Satisfactory handsheets were obtained.

EXAMPLE 29

*Table 5*

CONTROL

A 500 gram sample of bleached sulfite pulp was heated at reflux (90° C.) for 1 hour in 20 parts by volume of secondary butyl alcohol containing 1% (by weight based on pulp) of sulfuric acid. After being thoroughly washed with water, the pulp was made into handsheets and tested as described above. Additional data appear in Table 5 below.

EXAMPLE 22

*Table 5*

FORMALDEHYDE

The main purpose of this example was to determine the effect of increasing the cross-linking temperature above 60° C. Although the handsheets could be removed from the screen, they were too brittle to be of any practical use.

The conditions of Example 29 were repeated with 50 grams of formaldehyde added to the acidic secondary butyl alcohol-sulfite pulp mixture before refluxing (90° C.). After being thoroughly washed with water, the resulting cross-linked pulp was made into handsheets and tested as described above. Additional data appear in Table 5 below.

EXAMPLE 23

*Table 5*

FORMALDEHYDE

The main purpose of this example was to substantially repeat Example 10, using sulfite pulp instead of cotton linters. Satisfactory handsheets were obtained.

A 500 gram sample of bleached sulfite pulp and 50 grams of formaldehyde were heated at reflux (60° C.) for 1 hour in 20 parts by volume of acetone containing 1% (by weight based on pulp) of sulfuric acid. After being thoroughly washed with water, the pulp was made into handsheets and tested as described above. Additional data appear in Table 5 below.

EXAMPLE 25

*Table 5*

FORMALDEHYDE

Example 23 was repeated using nitric acid instead of sulfuric acid. Water was substituted for acetone as the reaction medium in order to avoid any possibility of introducing a hazard with an acetone-nitric acid mixture. The handsheets were uniform and brittle and therefore unsatisfactory. The nitric acid degraded the pulp substantially more than the sulfuric acid in Example 23 above. Additional data appear in Table 5 below.

The following Examples 24, 26, 27 and 28 were carried out according to the method disclosed in Kantorowicz U.S. Patent No. 2,010,635. In each example the paper handsheets were pilly and brittle and therefore unsatisfactory. Upon completion of drying, much of the pulp was in the form of lumps or pills most of which remained during beating and appeared in the paper handsheets.

EXAMPLE 24

*Table 5*

FORMALDEHYDE 454 grams of bleached sulfite pulp was immersed in 40,000 grams commercial Formalin solution (40% solids) and 910 grams concentrated nitric acid solution. After 15 minutes, the steeped pulp was pressed on a sintered glass filter to remove excess solution. The resulting pressed pulp (which contained about 30% by weight pulp on a dry basis) was heated at 60° C. until substantially free of water. Additional data appear in Table 5 below.

EXAMPLES 27 AND 28

*Table 5*

FORMALDEHYDE

Example 24 was repeated twice, except in Example 27 the pulp was dried at 90° C. and in Example 28 it was dried at 120° C. The results were substantially the same as in Example 24 except the degree of pulp degradation by the acid was noticeably greater at the higher temperatures.

EXAMPLE 26

*Table 5*

FORMALDEHYDE

Example 24 was repeated except sulfuric acid was used instead of nitric acid. Although the paper handsheets were still unsatisfactorily pilly and brittle, the sulfuric acid degraded the pulp substantially less than the nitric acid.

*Table 5*

HANDSHEET PROPERTIES OF FORMALDEHYDE CROSS-LINKED SULFITE PULP

[Effect of cross-linking temperature, type acid, and whether acid is removed before drying]

| Example No. | 29 (control) | 22 | 23 | 25 | 24 | 27 | 28 | 26 |
|---|---|---|---|---|---|---|---|---|
| Acid | None | $H_2SO_4$ | $H_2SO_4$ | $HNO_3$ | $HNO_3$ | $HNO_3$ | $HNO_3$ | $H_2SO_4$ |
| Cross-linking temperature, °C | None | 90 | 60 | 60 | 60 | 90 | 120 | 60 |
| Type process [1] | None | HT | HT | HT | K | K | K | K |
| Air resistance (sec./100 cc./in.²) | 550 | 113 | 110 | 120 | ---- | ---- | ---- | ---- |
| Water absorption (sec.) | 96 | 71 | 65 | 76 | ---- | ---- | ---- | ---- |
| Paper handsheets (formation and flexibility) | (²) | (³) | (²) | (³) | (⁴) | (⁴) | (⁴) | (⁴) |
| Handsheets removable intact from wire screens | Yes | Yes | Yes | Yes | No | No | No | No |

[1] HT=Present invention. K=Kantorowicz U.S. Patent 2,010,635.
[2] Uniform and flexible. [3] Uniform and brittle. [4] Pilly and brittle.

In the above examples (Examples 24, 27, 28 and 26 of Table 5) where the Kantorowicz type process (K) was used the cross-linking temperature and the drying temperature were the same because Kantorowicz effects cross-linking by drying, whereas in the above examples (Examples 22, 23 and 25 of Table 5) where the type process (HT) of the present invention was used, the cross-linking temperature was as shown and the drying temperature was 60° C. The paper handsheets prepared according to the Kantorowicz process were so pilly and nonuniform that any values obtained for porosity and absorbency would be meaningless. It will be noted from the examples in the present application that cotton linters give somewhat better porosity and absorbency than sulfite pulp. This is to be expected however because it is well known that sulfite pulp hydrates more readily than linters, so that with a given amount of beating sulfite pulp gives lower porosity and absorbency than linters.

As pointed out hereinbefore, when cross-linking with formaldehyde or a polyaldehyde it is well known that an acid catalyst must be used. We have found according to the present invention that this acid catalyst must be a substantially nonoxidizing mineral acid. We have also found according to the present invention that this acid catalyst must be removed from the cross-linked pulp prior to drying the pulp irrespective of the acid used. When we do not remove the acid prior to drying the pulp we have found that the pulp is degraded during drying to such an extent that it results in pilly or nonuniform and also brittle paper. When nitric acid is used as the catalyst, there is still greater degradation of the pulp during cross-linking (than when a nonoxidizing mineral acid is used), even when we cross-link at 60° C. and remove the nitric acid prior to drying. This is because nitric acid is an oxidizing agent as well as a hydrolyzing agent under the conditions of the present invention.

Thus, it will be seen that the present invention resides in the discovery that cross-linked cellulose pulp responds differently to mechanical beating than do prior art pulps used for papermaking, so that paper made from the beaten cross-linked pulp has an entirely different and unexpected and quite desirable combination of such properties as porosity, absorbency and uniformity of formation. More specifically, the present invention enables the manufacture of a sheet of paper with greatly increased porosity and absorbency and at the same time with at least as good and often better uniformity of formation. Heretofore, no means has been found to obtain high porosity and absorbency without a serious sacrifice in uniformity of formation because with conventional pulps the porosity and absorbency decrease in value with mechanical beating, whereas the uniformity of formation increases with increase in beating.

The paper product of this invention has a number of important uses, perhaps the two most important at present being filter papers and what is known in the art as absorbency papers. Filter papers, of course, are so well understood that the term is self-explanatory. To mention a few specific applications, filter papers are used as oil filters, battery plate separators, air filters and filters as used in the chemical laboratory. Absorbency papers include a wide and varied field of ultimate uses, such as e.g., electrical papers, saturation papers and impregnation or paper plastics.

The various sources of cellulosic materials commonly used in the manufacture of paper are applicable in the process of the present invention. These include, e.g. cotton linters, wood pulp and the like.

The present application is a continuation-in-part of our copending application Serial No. 724,817, filed March 31, 1958, and now abandoned, entitled Paper Manufacture.

As many apparent and widely different embodiments of this invention may be made without departing from the spirit and scope thereof, it is to be understood that we do not limit ourselves to the specific embodiments thereof except as defined in the appended claims.

What we claim and desire to protect by Letters Patent is:

1. In the method for forming paper wherein an aqueous suspension of a fibrous material is dewatered on a screen to form a matted web and said matted web is dried, the improvement which comprises employing as a fibrous material a water insoluble and alkali insoluble cross-linked cellulosic material, said cellulosic material having been cross-linked by intra-fiber chemical bonding with a polyfunctional reagent before being subjected to any refining operations in the papermaking process, the polyfunctional reagent being selected from the group consisting of polyhalides and polyepoxides, thereby obtaining a paper of substantially increased porosity and absorbency and at the same time at least without any substantial sacrifice in uniformity of formation.

2. In the method for forming paper wherein an aqueous suspension of a fibrous material is dewatered on a screen to form a matted web and said matted web is dried, the improvement which comprises employing as a fibrous material a water insoluble and alkali insoluble cross-linked cellulosic material, said cellulosic material having been cross-linked by intra-fiber chemical bonding with a polyfunctional reagent before being subjected to any refining operations in the papermaking process, the polyfunctional reagent being selected from the group consisting of formaldehyde and polyaldehydes, the cross-linking being effected at a temperature not in excess of about 60° C. in the presence of a substantially nonoxidizing mineral acid and substantially all of said acid which remains after said crosslinking being removed from said cellulosic material before drying same, thereby obtaining a paper of substantially increased porosity and absorbency and at the same time at least without any substantial sacrifice in uniformity of formation.

3. The process of claim 1, wherein the cross-linking is effected by reacting the cellulosic material with a polyhalide.

4. The process of claim 1, wherein the cross-linking is effected by reacting the cellulosic material with a polyepoxide.

5. The process of claim 2, wherein the cross-linking is effected by reacting the cellulosic material with a polyaldehyde.

6. The process of claim 2, wherein the cross-linking is effected by reacting the cellulosic material with formaldehyde.

7. The process of claim 1, wherein the fibrous material employed in making the improved paper comprises a mixture of cross-linked cellulosic material and noncross-linked cellulosic material.

8. The process of claim 2, wherein the fibrous material employed in making the improved paper comprises a mixture of cross-linked cellulosic material and noncross-linked cellulosic material.

9. The paper product of claim 1.

10. The paper product of claim 2.

References Cited in the file of this patent

UNITED STATES PATENTS

| | | |
|---|---|---|
| 2,010,635 | Kantorowicz | Aug. 6, 1935 |
| 2,623,042 | Vaughan | Dec. 23, 1952 |
| 2,752,269 | Condo | June 26, 1956 |
| 2,794,736 | Cohen | June 4, 1957 |
| 2,985,501 | Gagarine | May 23, 1961 |

OTHER REFERENCES

Mussen: TAPPI, pages 85, 86, and 87, Aug. 20, 1942.